US012053990B2

(12) United States Patent
Suyama

(10) Patent No.: US 12,053,990 B2
(45) Date of Patent: Aug. 6, 2024

(54) PRINTING APPARATUS AND PRINTING METHOD

(71) Applicant: SCREEN HOLDINGS CO., LTD., Kyoto (JP)

(72) Inventor: Tadayoshi Suyama, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 120 days.

(21) Appl. No.: 17/870,207

(22) Filed: Jul. 21, 2022

(65) Prior Publication Data

US 2023/0108609 A1 Apr. 6, 2023

(30) Foreign Application Priority Data

Sep. 24, 2021 (JP) ................................ 2021-155353

(51) Int. Cl.
*B41J 2/185* (2006.01)
*B41J 2/175* (2006.01)

(52) U.S. Cl.
CPC .......... *B41J 2/185* (2013.01); *B41J 2/17596* (2013.01)

(58) Field of Classification Search
CPC . B41J 2/18; B41J 2/17566; B41J 2/175; B41J 2/17596; B41J 2/185; B41J 2/1707; B41J 2/04501; B41J 2/17556
See application file for complete search history.

(56) References Cited

U.S. PATENT DOCUMENTS

| | | | | |
|---|---|---|---|---|
| 2015/0183227 | A1* | 7/2015 | Ishikawa | B41J 2/19 347/89 |
| 2016/0001570 | A1* | 1/2016 | Okayama | B41J 2/18 347/92 |
| 2018/0170066 | A1 | 6/2018 | Ohtsu et al. | |
| 2020/0094572 | A1 | 3/2020 | Muto | |

FOREIGN PATENT DOCUMENTS

| | | |
|---|---|---|
| JP | 2020-044823 A | 3/2020 |

OTHER PUBLICATIONS

Extended European Search Report issued in corresponding European Patent Application No. 22184909.4-1014, dated Nov. 18, 2022.

* cited by examiner

*Primary Examiner* — Jannelle M Lebron
(74) *Attorney, Agent, or Firm* — Rimon P.C.

(57) ABSTRACT

The idle operation is performed before time t1. The supply amount of the ink from the main tank 95 to the collection sub-tank 92 can be increased with the passage of time while the supply of the ink from the main tank 95 to the collection sub-tank 92 is continued before and after a transition to the print starting operation from the idle operation. Therefore, it is possible to deal with the start of ink discharge from the discharge head H. That is, the ink is already supplied to the collection sub-tank 92 by the supply pump 962 before the start of printing, and the start of ink discharge can be dealt with by increasing the ink supply amount. Therefore, the ink can be stably discharged by suppressing an output variation of the circulation pump 93 at the start of printing.

6 Claims, 8 Drawing Sheets

| CIRCULATION MODE | LIQUID LEVEL SENSOR 972 (COLLECTION SUB-TANK 92) | LIQUID LEVEL SENSOR 971 (SUPPLY SUB-TANK 91) | CIRCULATION PUMP 93 | SUPPLY PUMP 962 | COLLECTION PUMP 961 |
|---|---|---|---|---|---|
| D1 | Low | Low | MAINTAIN | On(Fh) | Off |
| D2 | Mid | Low | INCREASE | On(Fh) | Off |
| D3 | High | Low | INCREASE | On(Fl) | Off |
| D4 | Low | Mid | DECREASE | On(Fh) | Off |
| D5 | Mid | Mid | MAINTAIN | On(Fl) | On(Fo) |
| D6 | High | Mid | INCREASE | On(Fl) | On(Fo) |
| D7 | Low | High | DECREASE | On(Fl) | On(Fo) |
| D8 | Mid | High | DECREASE | On(Fl) | On(Fo) |
| D9 | High | High | DECREASE | On(Fl) | On(Fo) |
| D10 | | Ovf | Zero | Off | Off |
| D11 | Ovf | | Zero | Off | Off |

FIG. 5

PRINTING APPARATUS AND PRINTING METHOD

CROSS REFERENCE TO RELATED APPLICATION

The disclosure of Japanese Patent Application No. 2021-155353 filed on Sep. 24, 2021 including specification, drawings and claims is incorporated herein by reference in its entirety.

BACKGROUND OF THE INVENTION

1. Field of the Invention

This invention relates to a printing technique for printing an image on a printing medium by discharging an ink from a nozzle of a discharge head.

2. Description of the Related Art

JP 2020-44823A describes a printing apparatus including a supply sub-tank for storing an ink to be supplied to a discharge head and a collection sub-tank for storing the ink collected from the discharge head and configured to circulate the ink in a circulation path for returning the ink collected from the supply sub-tank to the collection sub-tank via the discharge head to the supply sub-tank. In this printing apparatus, the ink is fed from the supply sub-tank to the collection sub-tank via the discharge head by generating a negative pressure difference between the supply sub-tank and the collection sub-tank. Further, a circulation pump provided between the collection sub-tank and the supply sub-tank returns the ink from the collection sub-tank to the supply sub-tank.

SUMMARY OF THE INVENTION

In such a printing apparatus, if the ink is discharged from the discharge head according to the start of image printing, the amount of the ink circulating in the circulation path decreases. Such a decrease of the ink can be dealt with by starting the supply of the ink from a buffer tank connected to the collection sub-tank or the supply sub-tank. However, there have been cases where an output of the circulation pump largely varies due to an influence caused by the start of ink supply from the buffer tank in addition to an influence caused by the start of ink discharge from the discharge head and the discharge of the ink at the start of printing becomes unstable.

This invention was developed in view of the above problem and aims to enable stable discharge of an ink by suppressing an output variation of a circulation pump at the start of printing.

A printing apparatus according to the invention, comprises: a discharge head including a nozzle discharging an ink; a supply sub-tank storing the ink to be supplied to the discharge head; a collection sub-tank storing the ink collected from the discharge head; a supply pipe connecting the supply sub-tank and the discharge head, the supply pipe feeding the ink supplied from the supply sub-tank to the discharge head; a collection pipe connecting the discharge head and the collection sub-tank, the collection pipe feeding the ink collected from the discharge head to the collection sub-tank; a return pipe connecting the collection sub-tank and the supply sub-tank, the return pipe feeding the ink stored in the collection sub-tank to the supply sub-tank; a circulation pump provided to the return pipe, the circulation pump returning the ink collected to the collection sub-tank via the discharge head from the supply sub-tank to the supply sub-tank by feeding the ink from the collection sub-tank to the supply sub-tank; a buffer tank storing the ink; a collection pump provided to a pipe connecting the supply sub-tank and the buffer tank, the collection pump feeding the ink from the supply sub-tank to the buffer tank; a supply pump provided to a pipe connecting the buffer tank and the collection sub-tank, the supply pump feeding the ink from the buffer tank to the collection sub-tank; and a controller performing image printing to print an image on a printing medium by discharging the ink to the printing medium from the nozzle of the discharge head, wherein the controller performs an idle operation of controlling the collection pump and the supply pump so that the ink of an idle supply amount is supplied from the buffer tank to the collection sub-tank by the supply pump and the ink of an idle collection amount is collected from the supply sub-tank to the buffer tank by the collection pump before start of the image printing, and the controller performs a print starting operation of controlling the collection pump and the supply pump so that an amount of the ink collected from the supply sub-tank to the buffer tank by the collection pump decreases from the idle collection amount with the passage of time and an amount of the ink supplied from the buffer tank to the collection sub-tank by the supply pump is increased from the idle supply amount with the passage of time according to the start of the image printing.

A printing method according to the invention performing image printing to print an image on a printing medium by discharging an ink to the printing medium from a nozzle of a discharging head, comprises: performing an idle operation before start of the image printing while performing ink circulation to return the ink collected to a collection sub-tank via the discharge head from a supply sub-tank to the supply sub-tank by a circulation pump; and performing a print starting operation according to the start of the image printing while performing the ink circulation; wherein the ink of an idle supply amount is supplied to the collection sub-tank by a supply pump feeding the ink from the buffer tank to the collection sub-tank and the ink of an idle collection amount is collected to a buffer tank by a collection pump feeding the ink from the supply sub-tank to the buffer tank in the idle operation, and an amount of the ink supplied to the collection sub-tank by the supply pump is increased from the idle supply amount with the passage of time and an amount of the ink collected from the supply sub-tank by the collection pump is decreased from the idle collection amount with the passage of time in the print starting operation.

According to the invention (printing apparatus and printing method) thus configured, the idle operation is performed before the start of the image printing and the print starting operation is performed according to the start of the image printing. In the idle operation, the ink of the idle collection amount is collected to the buffer tank by the collection pump while the ink of the idle supply amount is supplied to the collection sub-tank by the supply pump. That is, the ink is supplied from the buffer tank to the collection sub-tank by the idle operation before the start of the image printing. At this time, since the ink supplied to the collection sub-tank returns to the buffer tank via the supply sub-tank, it is avoided that the amounts of the ink stored in the collection sub-tank and the supply sub-tank become excessive. Further, in the print starting operation, the amount of the ink collected from the supply sub-tank by the collection pump is decreased from the idle collection amount with the passage of time while the amount of the ink supplied to the collection sub-tank by the supply pump is increased from the idle supply amount with the passage of time. In this way, the start of ink discharge from the discharge head can be dealt with by increasing the supply amount of the ink with the passage of time while continuing the supply of the ink from the buffer tank to the collection sub-tank before and after a transition from the idle operation to the print starting operation. That is, in the invention, the ink is already supplied to the collection sub-tank by the supply pump before the start of printing, and the start of ink discharge is dealt with by increasing the ink supply amount. Therefore, the ink can be stably discharged by suppressing an output variation of the circulation pump at the start of imaging.

As described above, according to the invention, an ink can be stably discharged by suppressing an output variation of a circulation pump at the start of printing.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 5 is a table showing each circulation mode executed in the ink supply control.

DETAILED DESCRIPTION OF THE PROFFERED EMBODIMENTS

Figure 1:
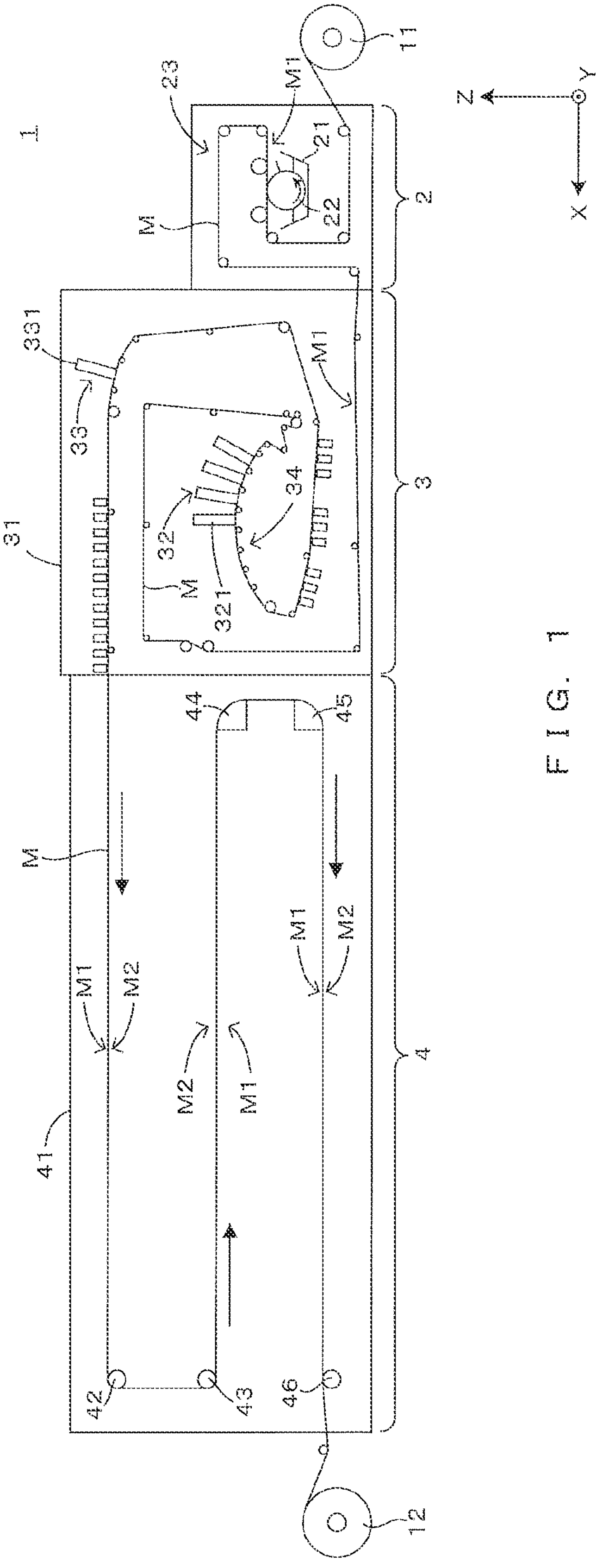
FIG. 1 is a front view schematically showing a printing system equipped with an example of a printing apparatus according to the invention.

FIG. 1 is a front view schematically showing a printing system equipped with an example of a printing apparatus according to the invention. In FIG. 1, to clarify an arrangement relationship of apparatus components, a XYZ coordinate system is shown in which a horizontal direction, in which a coating apparatus 2, a printing apparatus 3 and a drying apparatus 4 constituting the printing system 1 are arrayed, is referred to as an X direction, a horizontal direction orthogonal to the X direction is referred to as a Y direction and a vertical direction is referred to as a Z direction.

In this printing system 1, a coating process, a printing process and a drying process are applied to a printing medium M while the printing medium M which is elongated and strip-shaped is conveyed from a feeding roll 11 to a winding roll 12 in a roll-to-roll manner. That is, the coating apparatus 2 applies a coating liquid to the printing medium M. Then, the printing apparatus 3 prints an image by attaching an ink of each color to the printing medium M in an ink-jet method. Further, the drying apparatus 4 dries the inks attached to the printing medium M. Note that a material of the printing medium M is a film of OPP (oriented polypropylene), PET (polyethylene terephthalate) or the like. However, the material of the printing medium M is not limited to the film and may be paper or the like. Such a printing medium M is flexible. Further, out of both surfaces of the printing medium M, a recording surface on which an image is printed is referred to as a front surface M1 and a surface opposite to surface M1 is referred to as a back surface M2 as appropriate.

The coating apparatus 2 includes a pan 21 for storing a liquid primer (coating liquid), a gravure roller 22 partially immersed in the primer stored in the pan 21 and a conveyor 23 for conveying the printing medium M. In the coating apparatus 2, a coating region is provided in which the gravure roller 22 contacts the printing medium M being conveyed by the conveyor 23 from below, and the conveyor 23 conveys the printing medium M along the coating region with the front surface M1 of the printing medium M facing down. On the other hand, the gravure roller 22 supplies the primer to the coating region by rotating while holding the primer on the peripheral surface thereof. In this way, the primer supplied by the gravure roller 22 is applied to the front surface M1 of the printing medium M in the coating region. Further, in the coating region, an advancing direction of the printing medium M is opposite to a rotating direction of the peripheral surface of the gravure roller 22. That is, the primer is applied to the printing medium M in a so-called reverse kiss method. Then, the conveyor 23 conveys the printing medium M from the coating apparatus 2 to the printing apparatus 3 with the front surface M1 of the printing medium M having the primer applied thereto facing up.

The printing apparatus 3 includes a housing 31, a color printing part 32 arranged in the housing 31, a white printing part 33 arranged above the color printing part 32 in the housing 31, and a conveyor 34 for conveying the printing medium M by a plurality of rollers arranged in the housing 31.

The color printing part 32 includes a plurality of (four) head units 321 arrayed in an advancing direction of the printing medium M above the printing medium M being conveyed by the conveyor 34. Each head unit 321 includes a plurality of discharge heads and discharges a color ink of one of mutually different colors from nozzles of the discharge heads facing the front surface M1 of the printing medium M passing therebelow from above in an ink-jet method. Further, an ink supply mechanism is provided which supplies the color ink of each color to the head unit 321. That is, a color image is printed on the front surface M1 of the printing medium M by the color inks discharged from the nozzles of the discharge heads while the color inks are supplied to the discharge heads of the head units 321 by the ink supply mechanisms. Here, the color inks mean inks other than that having a white color and include inks of cyan, magenta, yellow, black and the like.

Further, the white printing part 33 includes a single head unit 331 arranged above the printing medium M being conveyed by the conveyor 34. The head unit 331 includes a plurality of discharge heads and discharges a white ink from nozzles of the discharge heads facing the front surface M1 of the printing medium M passing therebelow from above in the ink-jet method. Further, an ink supply mechanism is provided which supplies the white ink to the discharge heads of the head unit 331. That is, a white image is printed on the front surface M1 of the printing medium M by the white ink discharged from the nozzles of the discharge heads while the white ink is supplied to the discharge heads of the head unit 331 by the ink supply mechanism. Note that the configurations and operations of the ink supply mechanisms are described in detail later.

Note that, although not shown in FIG. 1, two types of dryers are provided in the housing 31 of the printing apparatus 3. One dryer is a pre-dryer for drying the color inks attached to the front surface M1 of the printing medium M by the color printing part 32. The other dryer is an upper dryer for drying the white ink attached to the front surface M1 of the printing medium M by the white printing part 33.

The drying apparatus 4 is for drying the inks attached to the front surface M1 of the printing medium M being conveyed from the printing apparatus 3. The drying apparatus 4 includes a housing 41 (drying furnace). Further, rollers 42, 43 and 46 are arranged on one side in the X direction (left side of FIG. 1) and air burn bars 44, 45 are arranged on the other side in the X direction (right side of FIG. 1) in the housing 41. In this way, a substantially S-shaped conveyance path is configured when viewed from the Y direction, and the printing medium M is conveyed along this conveyance path. The inks attached to the front surface M1 of the printing medium M are dried during this conveyance. Then, the printing medium M subjected to the drying process is carried out from the drying apparatus 4 and wound on the winding roll 12.

Figure 2:
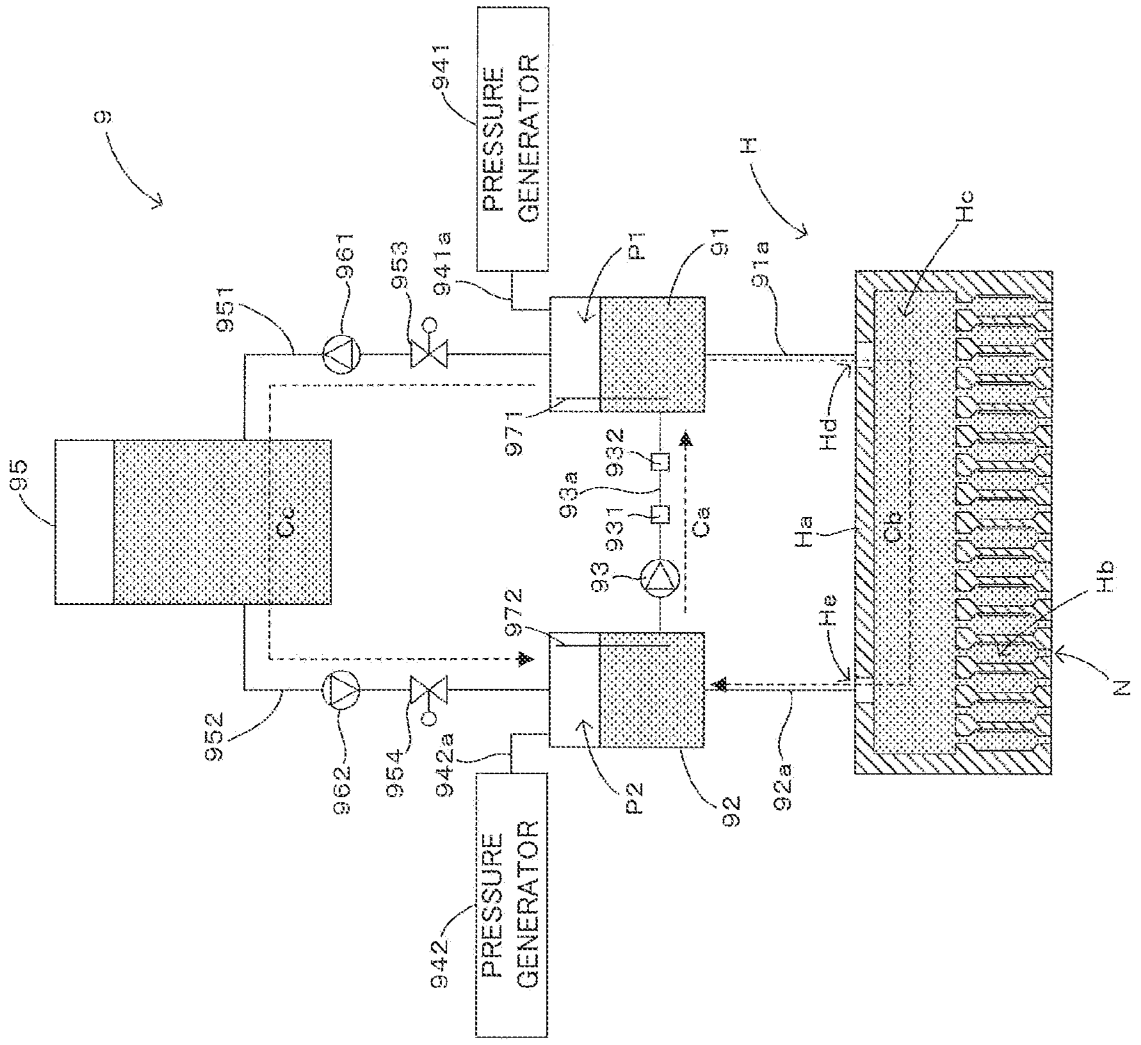
FIG. 2 is a diagram schematically showing the configuration of the discharge head and the ink supply mechanism that supplies the ink to the discharge head.

FIG. 2 is a diagram schematically showing the configuration of the discharge head and the ink supply mechanism that supplies the ink to the discharge head. This ink supply mechanism 9 is provided for each of the plurality of head units 321 and the single head unit 331 described above. Here, one ink supply mechanism 9 is described. Further, each of the plurality of head units 321 and the single head unit 331 includes a plurality of discharge heads H. Specifically, the plurality of discharge heads H are provided in parallel in a region between a supply sub-tank 91 and a collection sub-tank 92 which are included in the ink supply mechanism 9. However, one discharge head H is shown and described here.

As shown in FIG. 2, the discharge head H includes a housing Ha and a plurality of nozzles N are arrayed in a bottom part of the housing Ha and open. A plurality of cavities Hb respectively communicating with the plurality of nozzles N and an ink supply chamber He communicating with the plurality of cavities Hb are provided inside the housing Ha, and the ink supplied from the ink supply chamber He is stored in the cavities Hb. Piezoelectric elements provided in the cavities Hb push out the ink from the cavities Hb, whereby the ink is discharged from the nozzles N communicating with the cavities Hb. Note that a specific method for discharging the ink is not limited to the method by the piezoelectric elements, but may be a thermal method for heating an ink. Further, an ink inflow port Hd and an ink outflow port He are respectively open in an upper part of the discharge head H, and the ink flows into the ink supply chamber He via the ink inflow port Hd from the ink supply mechanism 9 and flows out to the ink supply mechanism 9 via the ink outflow port He from the ink supply chamber Hc.

The ink supply mechanism 9 includes the supply sub-tank 91 connected to the ink inflow port Hd via a supply pipe 91*a* and the collection sub-tank 92 connected to the ink outflow port He via a collection pipe 92*a*, and the ink is stored in each of the supply sub-tank 91 and the collection sub-tank 92. Each of these supply sub-tank 91 and collection sub-tank 92 is arranged above the discharge head H. Further, the ink supply mechanism 9 includes a return pipe 93*a* connecting the collection sub-tank 92 and the supply sub-tank 91 and a circulation pump 93 disposed at an intermediate position of the return pipe 93*a* to feed the ink from the collection sub-tank 92 to the supply sub-tank 91. That is, the ink can be fed along a first path Ca from the collection sub-tank 92 to the supply sub-tank 91 through the return pipe 93*a* by the circulation pump 93. Further, the ink supply mechanism 9 includes a filter 931 disposed at an intermediate position of the return pipe 93*a* and arranged between the circulation pump 93 and the supply sub-tank 91 and a degasser 932 arranged between the filter 931 and the supply sub-tank 91. The filter 931 removes solids from the ink flowing in the first path Ca and the degasser 932 removes gas from the ink flowing in the first path Ca.

Further, the ink supply mechanism 9 includes a supply-side pressure generator 941 (hereinafter, referred to as the "pressure generator 941" as appropriate) configured to apply a negative pressure P1 to the supply sub-tank 91. This pressure generator 941 includes an unillustrated pressure tank and a pressure transmission pipe 941*a* arranged so that one end of the pressure transmission pipe 941*a* communicates with and is connected to the pressure tank and the other end of the pressure transmission pipe 941*a* faces an atmosphere in the supply sub-tank 91. The pressure transmission pipe 941*a* transmits the pressure generated in the pressure tank to the supply sub-tank 91. The pressure generator 941 generates the negative pressure P1 inside the pressure tank by exhausting gas from the pressure tank and applies the generated negative pressure P1 to the supply sub-tank 91 via the pressure transmission pipe 941*a*. On the other hand, gas (air) is accumulated above the liquid surface of the ink in the supply sub-tank 91. That is, the ink is stored below a gas-liquid interface and the gas is present above the gas-liquid interface in the supply sub-tank 91. Therefore, the negative pressure P1 is applied to the gas-liquid interface in the supply sub-tank 91 by the pressure generator 941.

Further, the ink supply mechanism 9 includes a collection-side pressure generator 942 (hereinafter, referred to as the "pressure generator 942" as appropriate) configured to apply a negative pressure P2 lower than the negative pressure P1 to the collection sub-tank 92. This pressure generator 942 includes an unillustrated pressure tank and a pressure transmission pipe 942*a* arranged so that one end of the pressure transmission pipe 942*a* communicates with and is connected to the pressure tank and the other end of the pressure transmission pipe 942*a* faces an atmosphere in the collection sub-tank 92. The pressure transmission pipe 942*a* transmits the pressure generated in the pressure tank to the collection sub-tank 92. The pressure generator 942 generates the negative pressure P2 inside the pressure tank by exhausting gas from the pressure tank and applies the generated negative pressure P2 to the collection sub-tank 92 via the pressure transmission pipe 942*a*. On the other hand, gas (air) is accumulated above the liquid surface of the ink in the collection sub-tank 92. That is, the ink is stored below a gas-liquid interface and the gas is present above the gas-liquid interface in the collection sub-tank 92. Therefore, the negative pressure P2 is applied to the gas-liquid interface in the collection sub-tank 92 by the pressure generator 942.

As just described, the negative pressure P2 applied to the collection sub-tank 92 is lower than the negative pressure P1 applied to the supply sub-tank 91. Due to this difference between the negative pressures P2 and P1, the ink flows along a second path Cb from the supply sub-tank 91 to the ink supply chamber He of the discharge head H through the supply pipe 91 and further to the collection sub-tank 92 through the collection pipe 92*a*. Further, the ink flowing into the collection sub-tank 92 along the second path Cb is returned to the supply sub-tank 91 by the circulation pump 93 along the first path Ca from the collection sub-tank 92 to the supply sub-tank 92 through the return pipe 93*a*. In this way, the ink is circulated in a circulation path (second path Cb+first path Ca) returning to the supply sub-tank 91 after reaching the collection sub-tank 92 via the discharge head H from the supply sub-tank 91.

The ink supply mechanism 9 includes a main tank 95 and the main tank 95 can store a larger amount of the ink than the supply sub-tank 91 and the collection sub-tank 92. Further, the ink supply mechanism 9 includes a pipe 951 connecting the main tank 95 and the supply sub-tank 91 and a pipe 952 connecting the main tank 95 and the collection sub-tank 92. That is, the main tank 95 communicates with the supply sub-tank 91 via the pipe 951 and communicates with the collection sub-tank 92 via the pipe 952.

Further, the ink supply mechanism 9 includes a collection pump 961 mounted to the pipe 951 between the main tank 95 and the supply sub-tank 91 to collect the ink in the supply sub-tank 91 to the main tank 95, and a supply pump 962 mounted to the pipe 952 between the main tank 95 and the collection sub-tank 92 to supply the ink in the main tank 95 to the collection sub-tank 92. Therefore, the ink can be collected into the main tank 95 via the pipe 951 from the supply sub-tank 91 by the collection pump 961 and the ink can be supplied to the collection sub-tank 92 via the pipe 952 from the main tank 95 by the supply pump 962.

Further, the ink supply mechanism 9 includes a valve 953 mounted to the pipe 951 between the collection pump 961 and the supply sub-tank 91 and a valve 954 mounted to the pipe 952 between the supply pump 962 and the collection sub-tank 92. Accordingly, the main tank 95 and the supply sub-tank 91 are allowed to communicate by opening the valve 953, whereas the main tank 95 and the supply sub-tank 91 can be shut off from each other by closing the valve 953. Further, the main tank 95 and the collection sub-tank 92 are allowed to communicate by opening the valve 954, whereas the main tank 95 and the collection sub-tank 92 can be shut off from each other by closing the valve 954.

In the ink supply mechanism 9 thus configured, the ink flows along a third path Cc from the supply sub-tank 91 to the main tank 95 through the pipe 951 and further to the collection sub-tank 92 through the pipe 952 by getting the collection pump 961 and the supply pump 962 to work with the valves 953, 954 opened. Further, the ink flowing into the collection sub-tank 92 along the third path Cc is returned to the supply sub-tank 91 along the first path Ca by the circulation pump 93. In this way, the ink is circulated in a circulation path (third path Cc+first path Ca) to return to the supply sub-tank 91 through the return pipe 93*a* from the collection sub-tank 92 after reaching the collection sub-tank 92 from the supply sub-tank 91 through the pipe 951 and the pipe 952 via the main tank 95.

Further, the ink supply mechanism 9 includes a liquid level sensor 971 provided in the supply sub-tank 91 and a liquid level sensor 972 provided in the collection sub-tank 92. The liquid level sensor 971 detects a liquid level of the ink stored in the supply sub-tank 91, and the liquid level sensor 972 detects a liquid level of the ink stored in the collection sub-tank 92. Such liquid level sensors 971, 972 can be, for example, constituted by various level switches of the float type, electrode type or capacitance type.

Figure 3:
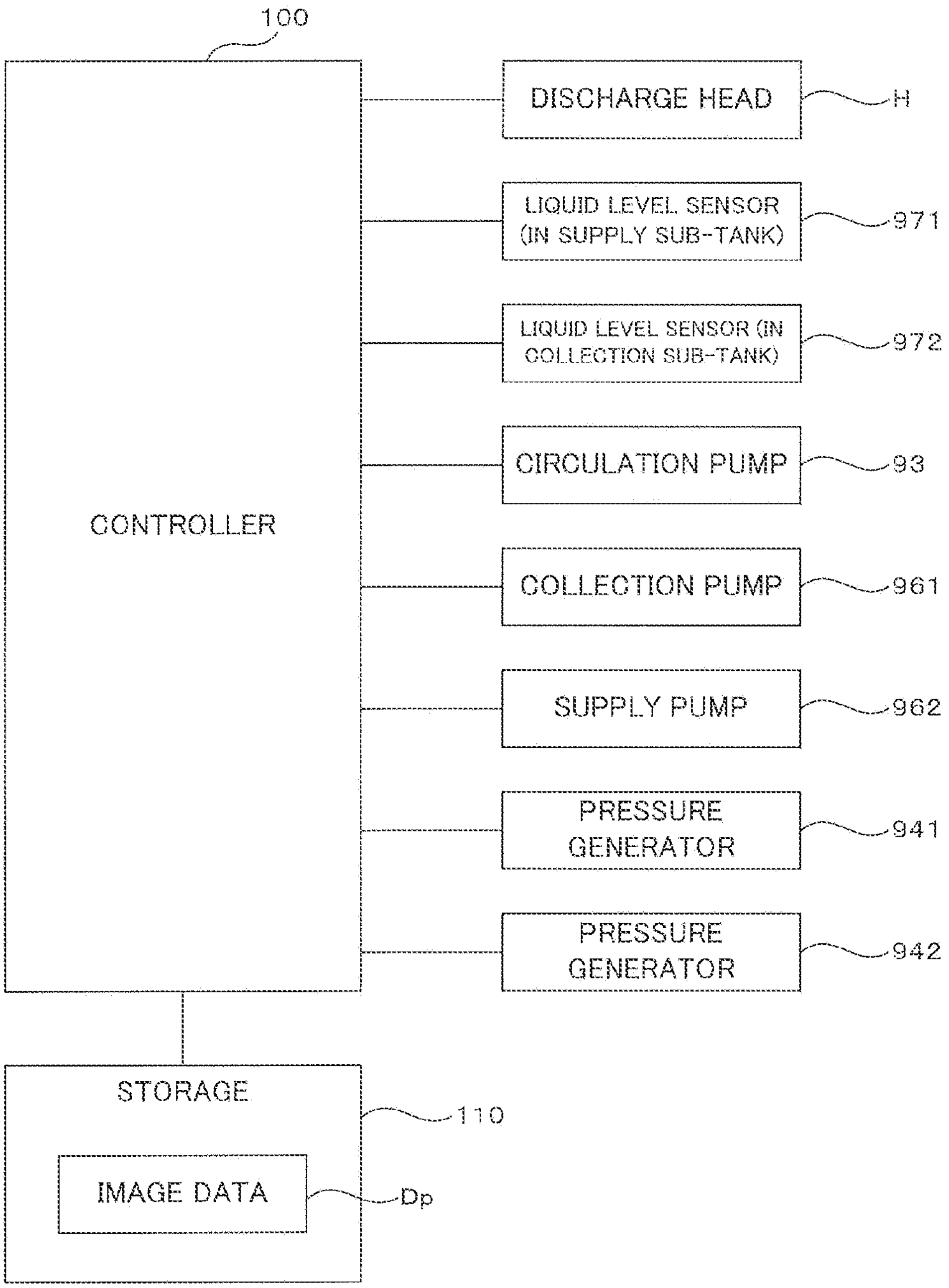
FIG. 3 is a block diagram showing an electrical configuration of the printing apparatus.

FIG. 3 is a block diagram showing an electrical configuration of the printing apparatus. As shown in FIG. 3, the printing apparatus 3 includes a controller 100 that controls the entire apparatus and a storage 110 that stores various pieces of data and programs. The controller 100 can be, for example, constituted by a processor such as a CPU (Central Processing Unit), a FPGA (Field-Programmable Gate Array) or the like. Further, the storage 110 is constituted by a HDD (Hard Disk Drive), a SSD (Solid State Drive) or the like and stores image data Dp indicating an image to be printed on the printing medium M and the like. The controller 100 causes the image indicated by the image data Dp to be printed on the printing medium M by causing the nozzles N of the discharge heads H to discharge the inks based on the image data Dp (image printing).

Further, the controller 100 controls an output of the circulation pump 93 based on detection values of the respective liquid level sensors 971, 972. Specifically, the controller 100 causes the ink to be fed from the collection sub-tank 92 to the supply sub-tank 91 via the return pipe 93*a* by controlling the output of the circulation pump 93 according to a difference between the liquid level in the supply sub-tank 91 detected by the liquid level sensor 971 and the liquid level in the collection sub-tank 92 detected by the liquid level sensor 972. In this way, the difference between the liquid level in the supply sub-tank 91 and the liquid level in the collection sub-tank 92 can be suppressed.

Further, the controller 100 controls a flow rate of the ink fed from the supply sub-tank 91 to the main tank 95 via the pipe 951 by the collection pump 961 (i.e. a liquid feed amount of the collection pump 961) and controls a flow rate of the ink fed from the main tank 95 to the collection sub-tank 92 via the pipe 952 by the supply pump 962 (i.e. a liquid feed amount of the supply pump 962). Here, the liquid feed amount is an amount of the ink fed per unit time. Further, the controller 100 controls the negative pressure P1 applied to the supply sub-tank 91 by the pressure generator 941 and the negative pressure P2 applied to the collection sub-tank 92 by the pressure generator 942.

In the configuration as described above, the amount of the ink fed from the collection sub-tank 92 to the supply sub-tank 91 by the circulation pump 93 is adjusted according to the difference between the liquid level in the supply sub-tank 91 and the liquid level in the collection sub-tank 92. In this way, the liquid level difference between the supply sub-tank 91 and the collection sub-tank 92 can be suppressed. However, the first path Ca for feeding the ink via the return pipe 93*a* by the circulation pump 93 constitutes the circulation path together with the second path Cb via the discharge head H. Therefore, a variation of the pressure (output) applied to the ink by the circulation pump 93 for feeding liquid has been transmitted to the second path Cb of the discharge head H to affect the discharge of the ink from the nozzles N in some cases. In contrast, the third path Cc is provided to feed the ink from the supply sub-tank 91 to the main tank 95 via the pipe 951 and from the main tank 95 to the collection sub-tank 92 via the pipe 952, and the third path Cc constitutes the circulation path together with the first path Ca. In this way, the ink can be satisfactorily discharged from the nozzles N by suppressing an output variation of the circulation pump 93. Particularly in this embodiment, the collection pump 961 and the supply pump 962 are operated based on the following ink supply control to suppress the output variation of the circulation pump 93 accompanying the start of image printing.

Figure 4:
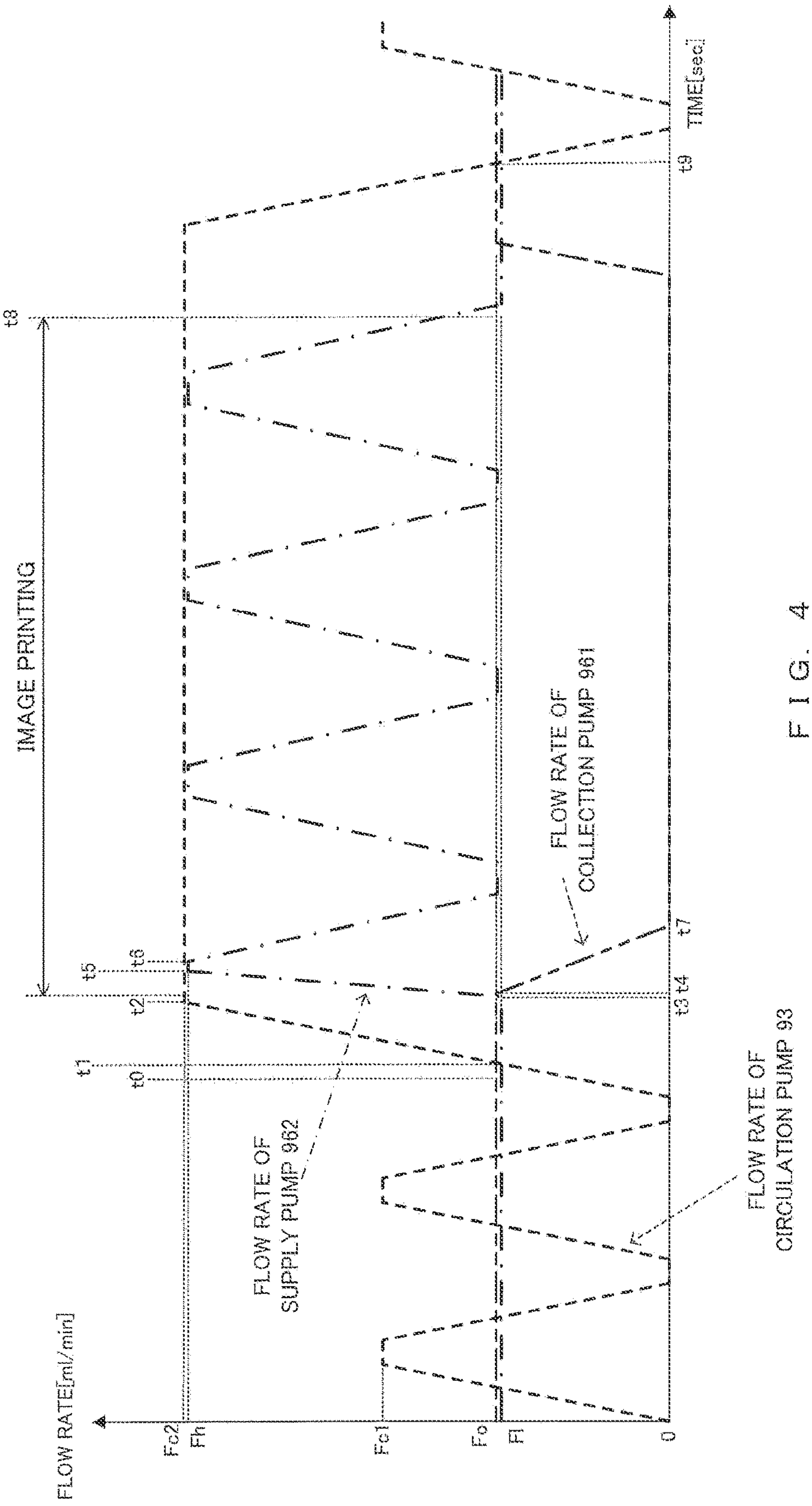
FIG. 4 is a timing chart showing examples of changes in flow rate of the circulation pump, the collection pump and the supply pump over time based on the ink supply control.

FIG. 4 is a timing chart showing examples of changes in flow rate of the circulation pump, the collection pump and the supply pump over time based on the ink supply control. In this timing chart, a horizontal axis represents time and a vertical axis represents the flow rates of the circulation pump 93, the collection pump 961 and the supply pump 962. In FIG. 4, a broken line represents the flow rate of the circulation pump 93, a dashed-dotted line represents the flow rate of the supply pump 962 and a two-dot chain line represents the flow rate of the collection pump 961. Each of flow rates Fl, Fo and Fh in FIG. 4 is larger than zero and the flow rate Fh is larger than the flow rates Fl and Fo. Note that the flow rate Fh is equal to or more than twice the flow rate Fl and equal to or more than twice the flow rate Fo. However, a ratio of the flow rate Fh to the flow rate Fl or Fo is not limited to this example. The flow rates Fo and Fl are substantially equal, but the flow rate Fo is slightly larger than the flow rate Fl. An operation represented by this timing chart is performed by the controller 100 controlling the circulation pump 93, the collection pump 961 and the supply pump 962. Particularly, the flow rate of the collection pump 961 can be switched at least in two stages of zero and the flow rate Fo (on-flow rate), and the flow rate of the supply pump 962 can be switched at least in three stages of zero, the flow rate Fl (low flow rate) and the flow rate Fh (high flow rate).

Figure 6A:
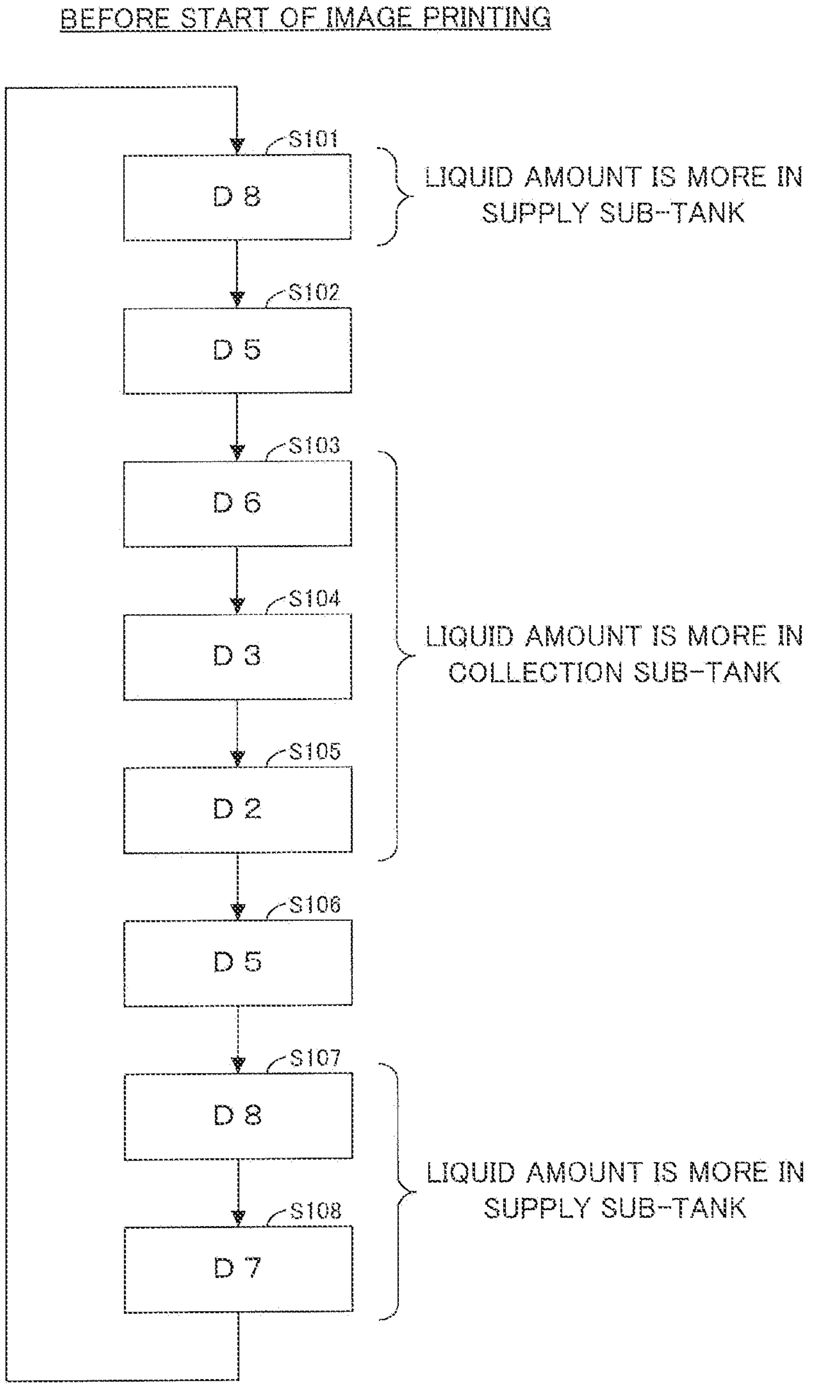
FIG. 6A is flow chart showing examples of an execution sequence of the circulation modes executed by ink supply control according to FIG. 5.
Figure 6B:
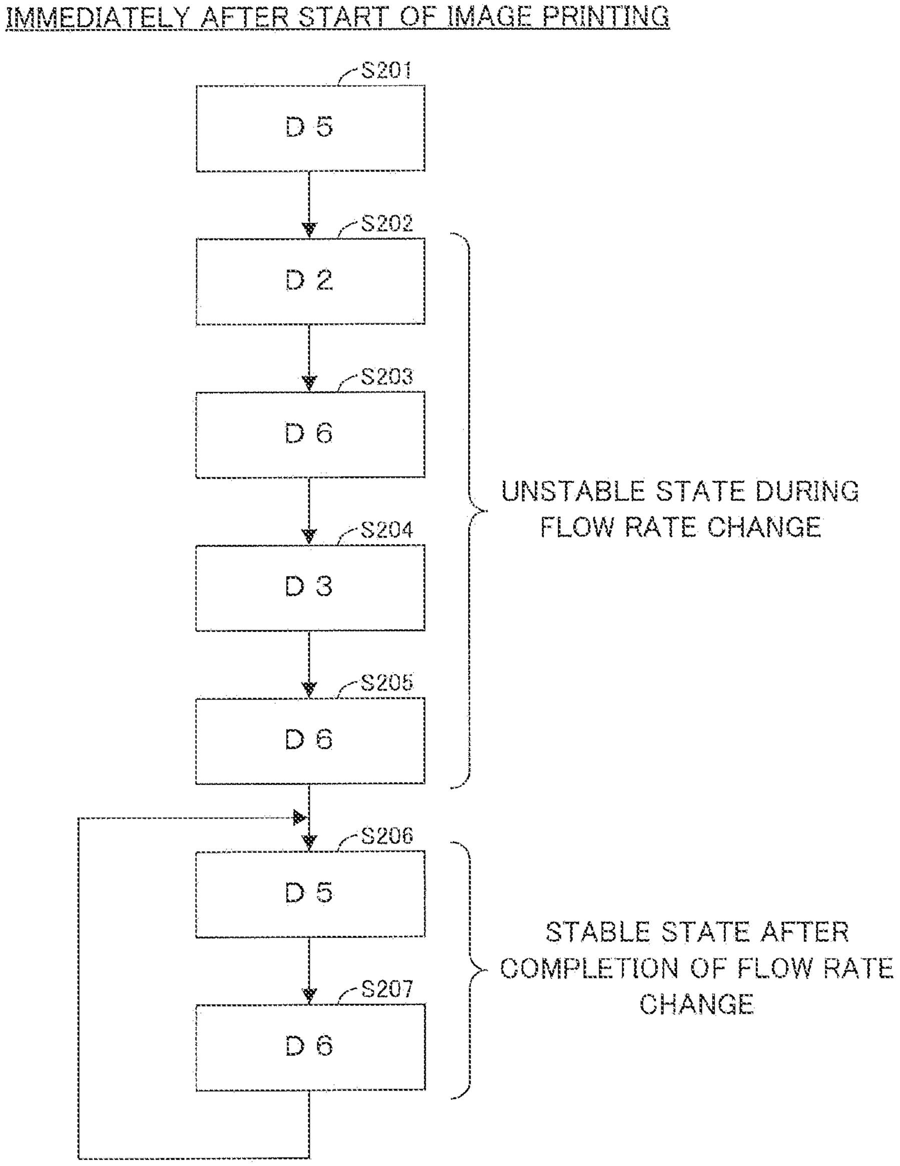
FIG. 6B is flow chart showing examples of an execution sequence of the circulation modes executed by ink supply control according to FIG. 5.
Figure 6C:
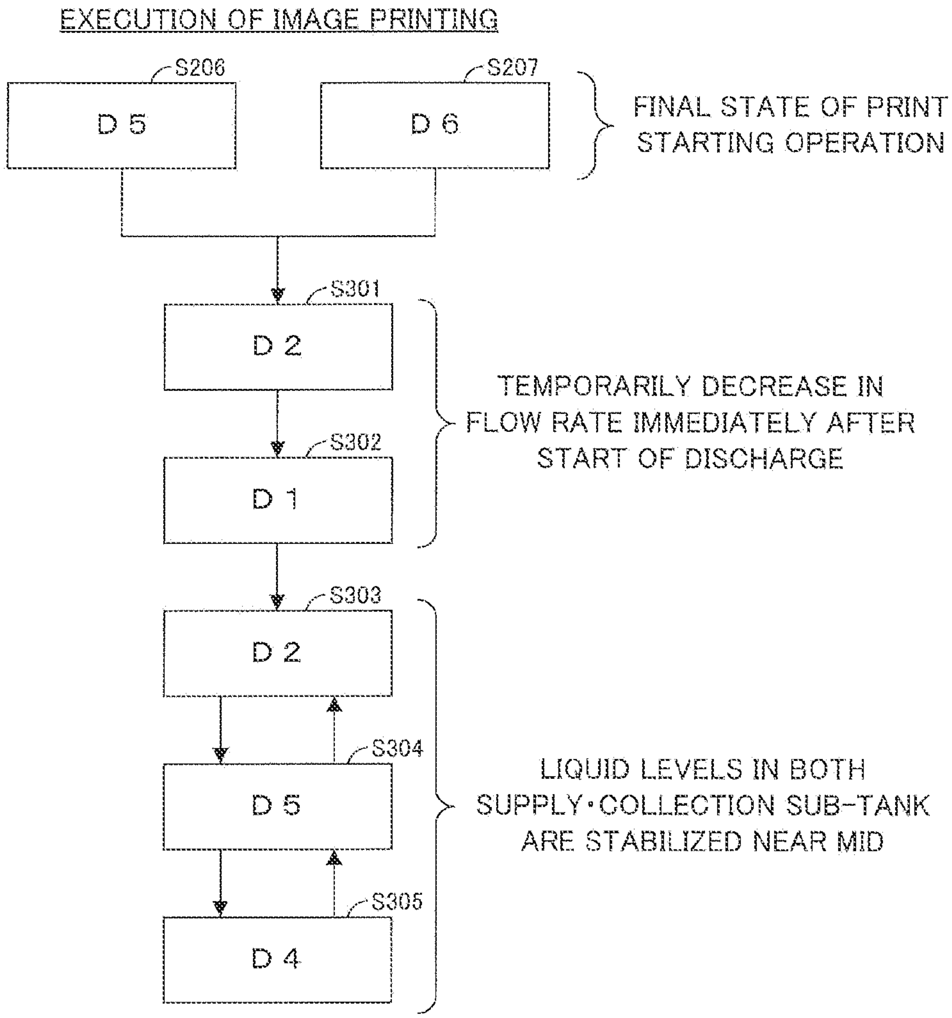
FIG. 6C is flow chart showing examples of an execution sequence of the circulation modes executed by ink supply control according to FIG. 5.

Specifically, the operation of the timing chart shown in FIG. 4 is obtained as a result of executing a control of FIGS. 5 and 6A to 6C. Here, FIG. 5 is a table showing each circulation mode executed in the ink supply control. FIGS. 6A to 6C are flow charts showing examples of an execution sequence of the circulation modes executed by ink supply control according to FIG. 5. Particularly, FIG. 6A shows a flow before the start of image printing, FIG. 6B shows a flow immediately after the start of image printing and FIG. 6C shows a flow during the execution of image printing.

As shown in FIG. 5, the liquid level sensor 972 detects the liquid level of the ink stored in the collection sub-tank 92 in four levels of Low, Mid, High and Ovf. Specifically, the liquid level sensor 972 outputs Low if the liquid level is less than a threshold value T1, outputs Mid if the liquid level is equal to or more than the threshold value T1 and less than a threshold value Tm higher than the threshold value T1, outputs High if the liquid level is equal to or more than the threshold value Tm and less than a threshold value Th higher than the threshold value Tm, and outputs Ovf if the liquid level is equal to or more than the threshold value Th. Similarly, the liquid level sensor 971 detects the liquid level of the ink stored in the supply sub-tank 91 in four levels of Low, Mid, High and Ovf.

In column of "Circulation Pump 93" of FIG. 5, "Maintain" indicates an operation of maintaining the output of the circulation pump 93, "Increase" indicates an operation of increasing the output of the circulation pump 93 by a certain value, "Decrease" indicates an operation of decreasing the output of the circulation pump 93 by a certain value, and "Zero" indicates an operation of zeroing the output of the circulation pump 93. In column of "Supply Pump 962", "On (Fh)" indicates an operation of setting the flow rate of the supply pump 962 to the flow rate Fh, "On (Fl)" indicates an operation of setting the flow rate of the supply pump 962 to the flow rate Fl, and "Off" indicates an operation of zeroing the flow rate of the supply pump 962. In column of "Collection Pump 961", "On (Fo)" indicates an operation of setting the flow rate of the collection pump 961 to the flow rate Fo, and "Off" indicates an operation of setting the flow rate of the collection pump 961 to zero.

As shown in FIG. 5, if the liquid level in the collection sub-tank 92 detected by the liquid level sensor 972 is Low and the liquid level in the supply sub-tank 91 detected by the liquid level sensor 971 is Low, the circulation pump 93 maintains the flow rate (i.e. no change), the supply pump 962 feeds the ink at the flow rate Fh and the collection pump 961 stops (circulation mode D1).

If the liquid level in the collection sub-tank 92 detected by the liquid level sensor 972 is Mid and the liquid level in the supply sub-tank 91 detected by the liquid level sensor 971 is Low, the circulation pump 93 increases the flow rate, the supply pump 962 feeds the ink at the flow rate Fh and the collection pump 961 stops (circulation mode D2).

If the liquid level in the collection sub-tank 92 detected by the liquid level sensor 972 is High and the liquid level in the supply sub-tank 91 detected by the liquid level sensor 971 is Low, the circulation pump 93 increases the flow rate, the supply pump 962 feeds the ink at the flow rate Fl and the collection pump 961 stops (circulation mode D3).

If the liquid level in the collection sub-tank 92 detected by the liquid level sensor 972 is Low and the liquid level in the supply sub-tank 91 detected by the liquid level sensor 971 is Mid, the circulation pump 93 decreases the flow rate, the supply pump 962 feeds the ink at the flow rate Fh and the collection pump 961 stops (circulation mode D4).

If the liquid level in the collection sub-tank 92 detected by the liquid level sensor 972 is Mid and the liquid level in the supply sub-tank 91 detected by the liquid level sensor 971 is Mid, the circulation pump 93 maintains the flow rate, the supply pump 962 feeds the ink at the flow rate Fl and the collection pump 961 feeds the ink at the flow rate Fo (circulation mode D5).

If the liquid level in the collection sub-tank 92 detected by the liquid level sensor 972 is High and the liquid level in the supply sub-tank 91 detected by the liquid level sensor 971 is Mid, the circulation pump 93 increases the flow rate, the supply pump 962 feeds the ink at the flow rate Fl and the collection pump 961 feeds the ink at the flow rate Fo (circulation mode D6).

If the liquid level in the collection sub-tank 92 detected by the liquid level sensor 972 is Low and the liquid level in the supply sub-tank 91 detected by the liquid level sensor 971 is High, the circulation pump 93 decreases the flow rate, the supply pump 962 feeds the ink at the flow rate Fl and the collection pump 961 feeds the ink at the flow rate Fo (circulation mode D7).

If the liquid level in the collection sub-tank 92 detected by the liquid level sensor 972 is Mid and the liquid level in the supply sub-tank 91 detected by the liquid level sensor 971 is High, the circulation pump 93 decreases the flow rate, the supply pump 962 feeds the ink at the flow rate Fl and the collection pump 961 feeds the ink at the flow rate Fo (circulation mode D8).

If the liquid level in the collection sub-tank 92 detected by the liquid level sensor 972 is High and the liquid level in the supply sub-tank 91 detected by the liquid level sensor 971 is High, the circulation pump 93 decreases the flow rate, the supply pump 962 feeds the ink at the flow rate Fl and the collection pump 961 feeds the ink at the flow rate Fo (circulation mode D9).

If the liquid level in the supply sub-tank 91 detected by the liquid level sensor 971 is Ovf, any of the circulation pump 93, the supply pump 962 and the collection pump 961 stops (circulation mode D10).

If the liquid level in the collection sub-tank 92 detected by the liquid level sensor 972 is Ovf, any of the circulation pump 93, the supply pump 962 and the collection pump 961 stops (circulation mode D11).

The operation of the timing chart of FIG. 4 is obtained mainly as a result of execution of the circulation modes D1 to D8 according to the liquid level detected by each of the liquid level sensors 972, 971. Note that the circulation modes D9 to D11 are provided to deal with an emergency in which the ink in the collection sub-tank 92 or the supply sub-tank 91 becomes excessive.

In an example shown in FIG. 4, preparation for image printing is performed in a period from time t0 to time t2, and image printing is performed in a period from time t2 to time t8. That is, the ink is discharged from the nozzles N of the discharge head H in the period from time t2 to time t8, whereas the ink is not discharged from the nozzles N of the discharge head H in a period before time t2 and in a period after time t8. Further, the ink is fed along the second path Cb due to a difference between the negative pressures P1 and P2 and any one of the circulation modes D1 to D8 corresponding to detection values of the liquid level sensors 971, 972 is executed throughout a period shown in this timing chart.

A period before time t0 is an idle period for waiting for the execution of image printing. Since the ink is not discharged from the nozzles N of the discharge head H in the idle period, the ink is not consumed. In this state, the ink is circulated along each of the circulation path (Cb+Ca) including the second path Cb and the first path Ca and the circulation path (Cc+Ca) including the third path Cc and the first path Ca. As a result, a situation where the ink in the supply sub-tank 91 is more than the ink in the collection sub-tank 92 and a situation where the ink in the collection sub-tank 92 is more than the ink in the supply sub-tank 91 are repeated.

As shown in FIG. 6A, in the former situation, the circulation modes D7, D8 are executed (Steps S101, S107 and S108) and the liquid level in the supply sub-tank 91 is brought closer to Mid from High by collecting the ink from the supply sub-tank 91 to the main tank 95 while the liquid feed amount from the collection sub-tank 92 to the supply sub-tank 91 is decreased. In a situation between the former and latter situations, the circulation mode D5 is executed (Steps S102, S106) and the liquid level of each of the supply sub-tank 91 and the collection sub-tank 92 is stabilized at Mid by maintaining the flow rate of the ink in each circulation path. In the latter situation, the circulation modes D6, D3 are executed (Steps S103, S104) and the liquid level in the collection sub-tank 92 is brought closer to Mid from High by increasing the liquid feed amount from the collection sub-tank 92 to the supply sub-tank 91. Alternatively, the circulation mode D2 is executed (Step S105) and the liquid level of the supply sub-tank 91 is stabilized at Mid by feeding the ink at the flow rate Fh from the main tank 95 to the collection sub-tank 92 while increasing the liquid feed amount from the collection sub-tank 92 to the supply sub-tank 91.

In short, in FIG. 6A, a control is executed to balance the liquid levels in the supply sub-tank 91 and the collection sub-tank 92 at Mid. As a result, an idle operation described next is performed in the idle period.

As shown in the idle period (before time t0) of FIG. 4, the collection pump 961 collects the ink at the flow rate Fo from the supply sub-tank 91 to the main tank 95 and the supply pump 962 supplies the ink at the flow rate Fl from the main tank 95 to the collection sub-tank 92 in the idle operation. In this way, the ink is fed along the third path Cc. Further, the ink is fed along the second path Cb at the flow rate corresponding to the difference between the negative pressure P1 in the supply sub-tank 91 and the negative pressure P2 in the collection sub-tank 92. Further, the circulation pump 93 works according to the detection values (liquid levels) of the liquid level sensor 971, 972 as described above. Specifically, as shown in FIG. 4, the flow rate of the circulation pump 93 varies between zero and a flow rate Fc1 larger than zero (larger than the flow rates Fo and Fl). In this way, the ink is circulated along each of the circulation path (Cc+Ca) including of the third path Cc and the first path Ca and the circulation path (Cb+Ca) including of the second path Cb and the first path Ca.

If the preparation of image printing is started at time to, the controller 100 controls the pressure generators 941, 942, whereby a pressure difference between the negative pressure P1 applied into the supply sub-tank 91 from the pressure generator 941 and the negative pressure P2 applied into the collection sub-tank 92 from the pressure generator 942 increases and the flow rate of the ink in the second path Cb changes. As a result, as shown in FIG. 6B, a state recovers to a stable state (Steps S206, S207), where the liquid levels in the supply sub-tank 91 and the collection sub-tank 92 are balanced at Mid and the circulation modes D5, D6 are repeated, by way of an unstable state (Steps S202 to S205), where the liquid levels in the supply sub-tank 91 and the collection sub-tank 92 largely vary and the circulation modes D2, D6, D3, D6 are executed, from a stable state (Step S201), where the liquid levels in the supply sub-tank 91 and the collection sub-tank 92 are balanced at Mid and the circulation mode D5 is executed. Further, as shown in FIG. 6C, since most of the ink flowing into the ink supply chamber He from the supply sub-tank 91 does not flow into the collection sub-tank 92 as the ink is discharged from the nozzles N, a transition is made from the stable state (Steps S206, S207), where the circulation modes D5, D6 are repeated, to Steps S301, S302, whereby the circulation modes D1, D2 are executed and the ink is fed at the flow rate Fh from the main tank 95 to the collection sub-tank 92. Then, as the liquid levels in the supply sub-tank 91 and the collection sub-tank 92 are stabilized near Mid, the circulation modes D2, D5 and D4 are executed (Steps S303 to S305).

In this way, according to the start of the preparation for image printing, an increase of the flow rate of the circulation pump 93 is started at time t1. That is, as shown in FIG. 4, the flow rate of the circulation pump 93 increases from the flow rate Fc1 to a flow rate Fc2 from time t1 to time t2 (after time t1). Further, if the flow rate of the circulation pump 93 reaches the flow rate Fc2 at time t2 (after time t1) and the flow rate is stabilized, a print starting operation is started. That is, as shown in FIG. 4, in this print starting operation, the collection pump 961 decreases the amount of the ink collected from the supply sub-tank 91 to the main tank 95 from the flow rate Fo with the passage of time while the supply pump 962 increases the amount of the ink supplied from the main tank 95 to the collection sub-tank 92 from the flow rate Fl with the passage of time. Specifically, at time t3 (after time t2), an increase of the flow rate of the supply pump 962 is started. That is, as shown in FIG. 4, the flow rate of the supply pump 962 increases from the flow rate F to the flow rate Fh from time t3 to time t5 (before time t6). After time t5, the supply pump 962 feeds the ink at the flow rate Fh.

Further, at time t4 (after time t3), a decrease of the flow rate of the collection pump 961 is started. That is, as shown in FIG. 4, the flow rate of the collection pump 961 decreases from the flow rate Fo to zero from time t4 to time t7 (after time t6).

As just described, the supply pump 962 performs a function of replenishing the ink consumed as the ink is discharged from the nozzles N. This ink replenishment is performed by a transition from the circulation modes D5, D6 to the circulation mode D2 as shown in FIG. 6C. That is, the supply pump 962 deals with ink replenishment by increasing the supply amount of the ink by the liquid feeding already performed, not starting the liquid feeding from a stopped state. Thus, a large pressure variation accompanying the start-up of the pump is not caused and the supply amount of the ink can be relatively smoothly increased. As a result, it is possible to avoid a situation where the output of the circulation pump 93 unstably varies due to an increase in the supply amount of the ink.

Further, if printing is finished and time t9 is reached, the controller 100 controls the pressure generators 941, 942, whereby the pressure difference between the negative pressure P1 applied into the supply sub-tank 91 from the pressure generator 941 and the negative pressure P2 applied into the collection sub-tank 92 from the pressure generator 942 is returned to the one during the idle operation.

Note that the respective timings in the print starting operation are not limited to those in this example. For example, concerning the end time t2 of the flow rate increase of the circulation pump 93 and the start time t3 of the flow rate increase of the supply pump 962, time t2 and time t3 may be simultaneous or time t2 may be later than time t3. Further, concerning the end time t5 of the flow rate increase of the supply pump 962 and the end time t7 of the flow rate decrease of the collection pump 961, time t5 and time t7 may be simultaneous or time t5 may be later than time t7.

As just described, the print starting operation deals with the discharge of the ink from the nozzles N by increasing the amount of the ink supplied to the circulation path (Cb+Ca) including the second path Cb and the first path Ca. Note that the flow rate of the supply pump 962 fluctuates between the flow rates Fh and Fl in a period between time t6 and time t8. This is because the circulation modes D2, D4 and D5 are selectively executed according to the detection values of the liquid level sensors 971, 972 (Steps S303 to S305). Further, as the print starting operation is performed, the flow rate of the circulation pump 93 is stabilized at the flow rate Fc2 larger than the flow rate Fc1. When image printing is finished at time t8, the discharge of the ink is stopped and the aforementioned idle operation is performed.

According to the embodiment described above, the idle operation is performed before time t1 and a print preparing operation is performed from time t1 to time t2. Thereafter, the print starting operation is performed (after time t2) when the flow rate of the circulation pump 93 becomes constant. In the idle operation, the ink is collected to the main tank 95 (buffer tank) at the flow rate Fo (idle collection amount) by the collection pump 961 while the ink is supplied to the collection sub-tank 92 at the flow rate Fl (idle supply amount) by the supply pump 962. That is, the supply of the ink from the main tank 895 to the collection sub-tank 92 is performed before the start of image printing by the idle operation. At this time, since the ink supplied to the collection sub-tank 92 is returned to the main tank 95 via the supply sub-tank 91, it is avoided that the amounts of the ink stored in the collection sub-tank 92 and the supply sub-tank 91 become excessive. Further, in the print starting operation after time t2, the amount of the ink collected from the supply sub-tank 91 by the collection pump 961 is decreased from the flow rate Fo (idle collection amount) with the passage of time while the amount of the ink supplied to the collection sub-tank 92 by the supply pump 962 is increased from the flow rate Fl (idle supply amount) with the passage of time. In this way, the supply amount of the ink from the main tank 95 to the collection sub-tank 92 can be increased with the passage of time while the supply of the ink from the main tank 95 to the collection sub-tank 92 is continued before and after a transition to the print starting operation from the idle operation. Therefore, it is possible to deal with the start of ink discharge from the discharge head H. That is, in this embodiment, the ink is already supplied to the collection sub-tank 92 by the supply pump 962 before the start of printing, and the start of ink discharge can be dealt with by increasing the ink supply amount. Therefore, the ink can be stably discharged by suppressing an output variation of the circulation pump 93 at the start of printing.

Further, in the print starting operation, an increased amount (=Fh−Fl) of the ink supplied to the collection sub-tank 92 by the supply pump 962 is more than a decreased amount (=Fo−0) of the ink collected from the supply sub-tank 91 by the collection pump 961. In such a configuration, an amount of the ink necessary for image printing can be reliably supplied to the collection sub-tank 92 while the output variation of the circulation pump 93 at the start of printing is suppressed.

Further, the controller 100 decreases the amount of the ink collected from the supply sub-tank 91 by the collection pump 961 to zero in the print starting operation. Such a configuration contributes to reliable supply of the amount of the ink necessary for image printing to the collection sub-tank 92.

Further, the circulation pump 93 feeds the amount of the ink corresponding to the difference between the amount of the ink stored in the supply sub-tank 91 and the amount of the ink stored in the collection sub-tank 92 from the collection sub-tank 92 to the supply sub-tank 91 through the idle operation and the print starting operation. In such a configuration, the amount of the ink stored in each of the supply sub-tank 91 and the collection sub-tank 92 can be properly controlled through the idle operation and the print starting operation.

Further, it is particularly preferable to perform the above idle operation and print starting operation for the supply of the ink to the discharge head for discharging the white ink. That is, the white ink tends to be used in large quantity in image printing. Thus, the amount of the ink, the supply of which from the main tank 95 to the collection sub-tank 92 should be started, is large at the start of image printing. This has significantly affected the output variation of the circulation pump 93 in some cases. In contrast, by applying the above respective operations to the discharge head H for discharging the white ink, the white ink can be stably discharged by suppressing the output variation of the circulation pump 93 at the start of printing.

In the embodiment described above, the printing apparatus 3 corresponds to an example of a "printing apparatus" of the invention, the supply sub-tank 91 corresponds to an example of a "supply sub-tank" of the invention, the supply pipe 91*a* corresponds to an example of a "supply pipe" of the invention, the collection sub-tank 92 corresponds to an example of a "collection sub-tank" of the invention, the supply pipe 92*a* corresponds to an example of a "collection pipe" of the invention, the circulation pump 93 corresponds to an example of a "circulation pump" of the invention, the return pipe 93*a* corresponds to an example of a "return pipe" of the invention, the main tank 95 corresponds to an example of a "buffer tank" of the invention, the collection pump 961 corresponds to an example of a "collection pump" of the invention, the supply pump 962 corresponds to an example of a "supply pump" of the invention, the controller 100 corresponds to an example of a "controller" of the invention, the flow rate Fl corresponds to an example of an "idle supply amount" of the invention, the flow rate Fo corresponds to an example of an "idle collection amount" of the invention, the discharge head H corresponds to an example of a "discharge head" of the invention, and the nozzle N corresponds to an example of a "nozzle" of the invention.

Note that the invention is not limited to the embodiment described above and various changes other than the aforementioned ones can be made without departing from the gist of the invention. For example, the ink supply control shown in FIGS. 4 to 6C may be executed for the discharge heads H for discharging the white ink, but may not be executed for the discharge heads H for discharging the color inks.

Further, in the print starting operation, the flow rate of the collection pump 961 needs not be decreased to zero and may be decreased from the flow rate Fo to a flow rate larger than zero.

Further, the valves 953, 954 are constantly open in the above description. However, for example, an operation of closing the valve 953 after the passage of a certain time after the output of the collection pump 961 is zeroed or closing the valve 954 after the passage of a certain time after the output of the supply pump 962 is zeroed may be performed as appropriate.

Further, it is not always necessary to provide the valve 953 or 954. Furthermore, the filter 931 or the degasser 932 can also be omitted as appropriate.

Further, a magnitude relationship of the flow rates Fl and Fo may be opposite to the above one or the flow rates Fl and Fo may be equal.

Further, the configuration for feeding the ink from the supply sub-tank 91 to the collection sub-tank 92 via the discharge head H is not limited to the above configuration using the negative pressures P1, P2. For example, a positive pressure may be applied to the supply sub-tank 91.

The invention is applicable to printing techniques in general for printing an image by discharging an ink.

The printing apparatus may be configured so that an increased amount of the ink supplied from the buffer tank to the collection sub-tank by the supply pump is more than a decreased amount of the ink collected from the supply sub-tank to the buffer tank by the collection pump in the print starting operation. In such a configuration, an amount of the ink necessary for the image printing can be reliably supplied to the collection sub-tank while the output variation of the circulation pump at the start of imaging is suppressed.

The printing apparatus may be configured so that the controller controls the collection pump so that the amount of the ink collected from the supply sub-tank to the buffer tank by the collection pump is decreased to zero in the print starting operation. Such a configuration contributes to reliable supply of the amount of the ink necessary for the image printing to the collection sub-tank.

The printing apparatus may be configured so that the circulation pump feeds an amount of the ink corresponding to a difference between an amount of the ink stored in the supply sub-tank and an amount of the ink stored in the collection sub-tank from the collection sub-tank to the supply sub-tank via the return pipe in the idle operation and the print starting operation. In such a configuration, the amount of the ink stored in each of the supply sub-tank and the collection sub-tank can be properly controlled through the idle operation and the print starting operation.

Further, the invention is particularly suitable for a printing apparatus in which a discharge head discharges a white ink. That is, the white ink tends to be used in large quantity in image printing. Thus, an amount of the ink, the supply of which from the buffer tank to the collection sub-tank should be started, is large at the start of the image printing. This has significantly affected an output variation of a circulation pump in some cases. In contrast, by applying the invention, the white ink can be stably discharged by suppressing the output variation of the circulation pump at the start of printing.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printing apparatus, comprising:

a discharge head including a nozzle discharging an ink;

a supply sub-tank storing the ink to be supplied to the discharge head;

a collection sub-tank storing the ink collected from the discharge head;

a supply pipe connecting the supply sub-tank and the discharge head, the supply pipe feeding the ink supplied from the supply sub-tank to the discharge head;

a collection pipe connecting the discharge head and the collection sub-tank, the collection pipe feeding the ink collected from the discharge head to the collection sub-tank;

a return pipe connecting the collection sub-tank and the supply sub-tank, the return pipe feeding the ink stored in the collection sub-tank to the supply sub-tank;

a circulation pump provided to the return pipe, the circulation pump returning the ink collected to the collection sub-tank via the discharge head from the supply sub-tank to the supply sub-tank by feeding the ink from the collection sub-tank to the supply sub-tank;

a buffer tank storing the ink;

a collection pump provided to a pipe connecting the supply sub-tank and the buffer tank, the collection pump feeding the ink from the supply sub-tank to the buffer tank;

a supply pump provided to a pipe connecting the buffer tank and the collection sub-tank, the supply pump feeding the ink from the buffer tank to the collection sub-tank; and a controller performing image printing to print an image on a printing medium by discharging the ink to the printing medium from the nozzle of the discharge head, wherein the controller performs an idle operation of controlling the collection pump and the supply pump so that the ink of an idle supply amount is supplied from the buffer tank to the collection sub-tank by the supply pump and the ink of an idle collection amount is collected from the supply sub-tank to the buffer tank by the collection pump before start of the image printing, and the controller performs a print starting operation of controlling the collection pump and the supply pump so that an amount of the ink collected from the supply sub-tank to the buffer tank by the collection pump decreases from the idle collection amount with the passage of time and an amount of the ink supplied from the buffer tank to the collection sub-tank by the supply pump is increased from the idle supply amount with the passage of time according to the start of the image printing.

2. The printing apparatus according to claim 1, wherein an increased amount of the ink supplied from the buffer tank to the collection sub-tank by the supply pump is more than a decreased amount of the ink collected from the supply sub-tank to the buffer tank by the collection pump in the print starting operation.

3. The printing apparatus according to claim 1, wherein the controller controls the collection pump so that the amount of the ink collected from the supply sub-tank to the buffer tank by the collection pump is decreased to zero in the print starting operation.

4. The printing apparatus according to claim 1, wherein the circulation pump feeds an amount of the ink corresponding to a difference between an amount of the ink stored in the supply sub-tank and an amount of the ink stored in the collection sub-tank from the collection sub-tank to the supply sub-tank via the return pipe in the idle operation and the print starting operation.

5. The printing apparatus according to claim 1, wherein the discharge head discharges a white ink.

6. A printing method performing image printing to print an image on a printing medium by discharging an ink to the printing medium from a nozzle of a discharge head, comprising:

performing an idle operation before start of the image printing while performing ink circulation to return the ink collected to a collection sub-tank via the discharge head from a supply sub-tank to the supply sub-tank by a circulation pump; and performing a print starting operation according to the start of the image printing while performing the ink circulation;

wherein the ink of an idle supply amount is supplied to the collection sub-tank by a supply pump feeding the ink from a buffer tank to the collection sub-tank and the ink of an idle collection amount is collected to the buffer tank by a collection pump feeding the ink from the supply sub-tank to the buffer tank in the idle operation, and an amount of the ink supplied to the collection sub-tank by the supply pump is increased from the idle supply amount with the passage of time and an amount of the ink collected from the supply sub-tank by the collection pump is decreased from the idle collection amount with the passage of time in the print starting operation.

* * * * *